3,565,918
7α-DIFLUOROMETHYL-A-NOR-B-HOMO
STEROIDS AND THEIR PREPARATION
John H. Fried, Palo Alto, Calif., assignor to Syntex Corporation, Panama, Panama, a corporation of Panama
No Drawing. Filed Sept. 26, 1966, Ser. No. 581,710
Int. Cl. C07c 171/06; C07d 5/04, 7/04
U.S. Cl. 260—345.9     9 Claims

ABSTRACT OF THE DISCLOSURE

The present disclosure relates to 3,5-dioxo-7α-difluoromethyl-A-nor-B-homo androstanes and 19-norandrostanes and derivatives thereof wherein the C–17β position is elaborated with a hydroxyl, tetrahydrofuran - 2 - yloxy, tetrahydropyran - 2 - yloxy or hydrocarbon carboxylic acyloxy group of less than 12 carbon atoms, and the C–17α position with a hydrogen, (lower)alkyl, (lower)-alkenyl, (lower)alkynyl or halo(lower)alkynyl group. These compounds are useful as anabolic and androgenic agents. Those compounds which bear a 17α-ethynyl or -haloethynyl grouping are additionally useful as progrestational agents. Also taught is a method for the preparation of these compounds.

---

This invention relates generally to novel and useful steroids. It also relates to methods by which these steroids are prepared.

This invention more particularly pertains to 7α-difluoromethyl-A-nor-B-homosteroids of the androstane and 19-norandrostane series. These new and useful compounds are represented by structural Formula V.

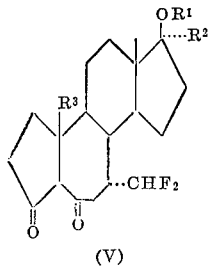

(V)

In the above Formula V, $R^1$ represents hydrogen, tetrahydrofuran-2-yl, tetrahydropyran-2-yl, or a hydrocarbon carboxylic acyl group of less than 12 carbon atoms; $R^2$ represents hydrogen, (lower)alkyl, (lower)alkenyl, (lower)alkynyl, or halo(lower)alkynyl; and $R^3$ represents hydrogen or methyl.

By the terms "(lower)alkyl," "(lower)alkenyl," "(lower)alkynyl," and "halo(lower)alkynyl" are intended branched or straight chain hydrocarbon groups of six or less carbon atoms. Representations of such (lower)alkyl groups are thus methyl, ethyl, propyl, butyl, pentyl, and hexyl; of such (lower)alkenyl groups are vinyl, propenyl, and the like; of such (lower)alkynyl groups are ethynyl, propynyl, and the like; and of such halo(lower)alkynyl groups are chloroethynyl, chloropropynyl, and the like.

The hydrocarbon carboxylic acyl groups of the present invention will contain less than 12 carbon atoms and may be of a straight, branched, cyclic or cyclic-aliphatic chain structure. These may be saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, dichloroacetate, propionate, phenylpropionate, enanthate, benzoate, trimethylacetate, t-butylacetate, phenoxyacetate, cyclopentylpropionate, aminoacetate, β-chloropropionate, decanoate, adamantoate, and the like.

The present invention thus embraces A-nor-B-homo-androstanes and -19-norandrostanes containing a 7α-difluoromethyl group. These compounds are potent anabolic and androgenic derivatives and are thus useful for the treatment of androgen deficiencies and for various debilitative conditions such as those encountered in advanced age, post-operative recuperation, and the like. These compounds are also useful to stimulate growth with attendant improved health and appearance. Those compounds hereof in which $R^2$ is ethynyl or haloethylnyl exhibit pronounced progestational activity and are useful for the control of fertility and for the management of various menstrual disorders.

These compounds are administered via any of the commonly employed and accepted techniques such as in the form of pharmaceutically acceptable non-toxic solutions, suspensions, tablets, capsules, and the like, including oral and parenteral administrations. Dosage levels vary, generally depending upon the subject being treated, but daily dosages range from about 0.1 to 10 mg. per kg. body weight. These compounds can also be combined with various other therapeutic agents.

One reaction sequence illustrating the preferred synthesis of the novel compounds represented by Formula V above involves starting with a 3-keto-Δ$^{4,6}$-androstadiene or -19 - norandrostadiene. These starting compounds are treated with a molar excess of an alkali or alkaline earth metal salt of a haloacid such as chlorodifluoroacetic acid in inert, non-aqueous solvent at temperatures above the decomposition temperature of the particular salt employed. A difluoromethylene group is thereby fused across the conjugate double bond between C–6 and C–7 which is most remote to the keto function.

Thereafter, the 6,7-difluoromethylene steroid is treated in liquid medium at temperatures ranging from room temperature (about 25° C.) to 150° C. or more, preferably at atmospheric pressure, and for varying duration (usually at least 30 minutes) with reagents which effect opening of the fused cyclopropyl ring, such as zinc dust in acetic acid, to provide the corresponding derivative containing a difluoromethyl group at C–7 which is oriented identical to its antecedent fused difluoromethylene group.

Following the ring opening procedure, the 3-keto-7-difluoromethyl-Δ$^4$ steroid is treated with alkaline hydrogen peroxide in inert, aqueous organic solvent such as methanol, ethanol, and the like, at temperatures reduced below room temperature, preferably about 0° C., for from 1 to 12 hours to give the corresponding 4,5-epoxide compound. This procedure is described in more detail by Ringold et al., Journal of Organic Chemistry 21, 1432 (1956).

The thus prepared epoxide derivative is irradiated in inert organic solvent such as dioxane, benzene, and the like, under a low pressure quartz lamp light source at about 245 mμ for from about 10 hours to 54 hours, such as by the procedure disclosed by Lehmann et al., Helv. Chim. Acta. 45, 1031 (1962) to thus afford the product 7α - difluoromethyl-A-nor-B-homo compound represented by Formula V above.

The foregoing process sequence is represented by the following reaction scheme using partial formulas.

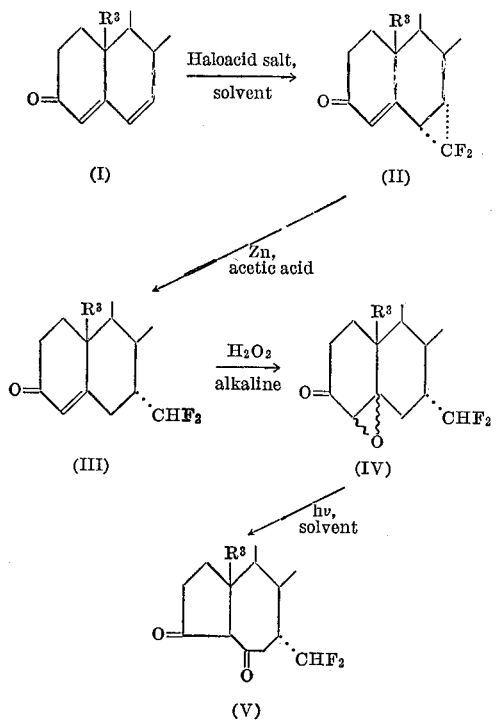

R³ being as hereinbefore defined and the compounds represented by partial Formula V corresponding to the complete structural Formula V set forth above.

In the above described and depicted process it is understood that the various substituents at C-17 as set forth hereinabove by groups R¹ and R² are present initially. Alternatively, these groups are introduced after the 6,7-ring opening step. Thus, the ring opened 7α-difluoromethyl compounds of the present invention are elaborated at C-17 after prior selective protection of the 3-keto group such as by forming the corresponding enol ether thereof by treatment with ethyl orthoformate in the presence of acid catalyst.

After such protection, the 17-keto group is treated with an organometallic such as alkyl lithium, alkenyl lithium, alkynyl lithium, or alkyl magnesium halide, alkenyl magnesium halide, or alkynyl magnesium halide which provides the corresponding 17α-aliphatic-17β-ols. The 17α-alkenyl and 17α-alkyl groups such as vinyl and ethyl are alternatively provided through partial or complete hydrogenation, respectively, of the 17α-alkynyl group such as ethynyl. The 17α-haloalkynyl groups are prepared such as by treatment of the 17-keto compound with dihaloethylene in the presence of methyl lithium.

In lieu of the process described above, the 17-keto can be reduced such as by treatment with sodium borohydride in methanol or lithium aluminum hydride in tetrahydrofuran to give the corresponding 17β-hydroxy compound, unsubstituted in the 17α position.

The secondary 17β-ols may be esterified by an acylating agent such as acetic anhydride in pyridine. Esterification of the tertiary 17β-hydroxyl is done with an acylating agent such as acetic anhydride and acetic acid in the presence of an acid such as p-toluenesulfonic acid and the like. Etherification of the 17β-hydroxyl with dihydrofuran and dihydropyran in the presence of p-toluenesulfonic acid affords the 17β-tetrahydrofuranyl and 17β-tetrahydropyranyl ether, respectively.

After such desired elaboration has taken place, the 3-keto group is restored through conventional acid hydrolysis.

In the preparation of the 6,7-difluoromethylene derivatives (II), addition occurs exclusively or predominantly across the Δ⁶-double bond. The orientation of the methylene group is generally alpha with respect to the carbon atoms to which it is attached. Similarly, the ring opened 7-difluoromethyl group in retaining identical orientation is generally alpha. Any beta isomer can be readily separated, such as by chromatography, and analogously treated via the subsequent processes. The oxido compounds (IV), in general, consist of a mixture of the alpha and beta isomers. These can be separated, as by fractional crystallization, but the mixture is preferably used without a separation procedure in the photochemical reaction which follows.

The following examples serve to further typify the manner by which this invention can be practiced but they are not to be construed as limitations upon the overall scope hereof.

EXAMPLE 1

To a refluxing solution of 1 g. of androsta-4,6-dien-17β-ol-3-one in 10 ml. of dimethyl diethylene glycol ether is added over a two-hour period in a dropwise fashion with stirring, a solution of 35 equivalents of sodium chlorodifluoroacetate, in 40 ml. of dimethyl diethylene glycol ether. The mixture is refluxed until the U.V. spectra indicates the disappearance of the 3-keto-Δ⁴,⁶-diene system and is then filtered. The filtrate is evaporated to dryness and the residue is briefly refluxed with 10 ml. of 1.33 N sodium methoxide in methanol. After neutralization with acetic acid, the mixture is diluted with methylene chloride and washed with water. The organic solution is then dried over sodium sulfate and evaporated to dryness. The residue is chromatographed on alumina, eluting with methylene chloride to yield 6α,7α-difluoromethyleneandrost-4-en-17β-ol-3-one.

In a similar fashion, there is obtained from estra-4,6-dien-17β-ol-3-one via the procedure of this example, 6α,7α - difluoromethyleneestr-4-en-17β-ol-3-one. Similarly, 6α,7α-difluoromethyleneestr-4-ene-3,17-dione and 6α,7α-difluoromethyleneandrost-4-ene-3,17-dione are prepared from estra-4,6-diene-3,17-dione and androsta-4,6-diene-3,17-dione, respectively.

EXAMPLE 2

A stirred solution of 1.6 g. of 6α,7α-difluoromethyleneestr-4-ene-3,17-dione in 25 ml. of acetic acid is heated at reflux for 1 hour with 5 portions of 500 mg. each of zinc dust. The mixture is then stirred at room temperature for 1 hour, filtered, the residue being washed with acetic acid, and diluted with 10 ml. of water. This mixture is extracted with methylene chloride and the methylene chloride extracts are in turn washed with water, 2 N sodium bicarbonate solution, and water. After drying this organic solution with magnesium sulfate, it is evaporated to dryness and chromatographed on alumina with hexane:methylene chloride followed by methylene chloride:ethyl acetate to yield 7α-difluoromethylestr-4-ene-3,17-dione.

In a manner similar to the procedure of this example, 7α-difluoromethylandrost-4-ene-3,17-dione, 7α - difluoromethylestr-4-en-17β-ol-3-one, and 7α - difluoromethylandrost-4-en-17β-ol-3-one are prepared.

In lieu of the use of zinc dust in acetic acid in the preceding procedure, the use of zinc-copper couple in ethanol and n-propanol or zinc dust in tetrahydrofuran affords similar results.

EXAMPLE 3

To a suspension of 1 g. of 7α-difluoromethylestr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until a solid forms. The solid then formed is collected by filtration, washed with water and air dried to yield 3-ethoxy-7α-difluoromethylestra-3,5(6)-dien-17-one which is recrystallized from acetone:hexane.

A solution of 1 g. of sodium borohydride in 3 ml. of water is added to an ice-cooled solution of 1 g. of 3-ethoxy-7α-difluoromethylestra-3,5(6)-dien-17-one in 120 ml. of methanol and the mixture is then allowed to stand for 16 hours at room temperature. The excess reagent is decomposed by addition of acetic acid and the solution is then concentrated to a small volume in vacuum and diluted with water. The product is extracted with ethyl acetate and these extracts are washed with water, dried and evaporated to yield 3-ethoxy-7α-difluoromethylestra-3,5(6)-dien-17β-ol which may be further purified by recrystallization from acetone:hexane.

A mixture of 1 g. of 3-ethoxy-7α-difluoromethylestra-3,5(6)-dien-17β-ol, 4 ml. of pyridine and 2 ml. of acetic anhydride is allowed to stand at room temperature for 15 hours. The mixture is then poured into ice water and the solid which forms is collected by filtration, washed with water and dried to yield 3-ethoxy-7α-difluoromethyl-17β-acetoxyestra-3,5(6)-diene which may be further purified through recrystallization from acetone:hexane.

To a solution of 1 g. of 3-ethoxy-7α-difluoromethyl-17β-acetoxyestra-3,5(6)-diene in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 7α-difluoromethyl-17β-acetoxyestr-4-en-3-one.

Similarly prepared by the known procedures of this example is 7α-difluoromethyl-17β-acetoxyandrost-4-en-3-one.

A solution of 1 g. of 3-ethoxy-7α-difluoromethylestra-3,5(6)-dien-17β-ol in 60 ml. of anhydrous ether is treated with 7.5 molar equivalents of ethylmagnesium bromide in ether and, after a few minutes, with 7.5 molar equivalents of adamantoyl chloride. The mixture is allowed to stand at room temperature for 15 hours, then diluted with water, and extracted with methylene chloride. The extracts are washed with water to neutrality, dried and evaporated. The residue is chromatographed on neutral alumina, eluting with ether:hexane, to yield 3-ethoxy-7α-difluoromethyl - 17β - adamantoyloxyestra-3,5(6)-diene which is recrystallized from acetone:hexane.

Acid hydrolysis via the procedure set forth above in this example affords 7α-difluoromethyl-17β-adamantoyloxyestr-4-en-3-one.

In like manner, by substituting dichloroacetyl chloride, propionyl chloride, 3-phenylpropionyl chloride, and decanoyl chloride for adamantoyl chloride in the above procedure followed by acid hydrolysis of the acyloxy product thereof, the following derivatives are respectively obtained:

7α-difluoromethyl-17β-dichloroacetoxyestr-4-en-3-one,
7α-difluoromethyl-17β-propionyloxyestr-4-en-3-one,
7α-difluoromethyl-17β-(3-phenylpropionyloxy)estr-4-en-3-one, and
7α-difluoromethyl-17β-decanoyloxyestr-4-en-3-one.

EXAMPLE 4

A solution of 5 g. of 3-ethoxy-7α-difluoromethylestra-3,5(6)-dien-17-one in 250 ml. of thiophen-free benzene is treated with an equimolar amount of methylmagnesium bromide in anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3-ethoxy-7α-difluoromethyl-17α-methylestra-3,5(6)-dien-17β-ol which is recrystallized from methylene chloride:hexane.

This compound is hydrolyzed with acid following the procedure set forth in the fourth paragraph of Example 3 to yield 7α-difluoromethyl-17α-methylestr-4-en-17β-ol-3-one.

Similar to the procedure of this example is prepared 7α-difluoromethyl-17α-methylandrost-4-en-17β-ol-3-one.

EXAMPLE 5

A solution of 8.5 g. of 1,2-dichloroethylene in 50 ml. of anhydrous ether is added in a dropwise fashion, under nitrogen and at 0° C. over a 30-minute period to a stirred solution of 15 ml. of 1.4 N methyl lithium in anhydrous ether. After stirring for an additional 90 minutes at room temperature, a solution of 0.5 g. of 3-ethoxy-7α-difluoromethylestra-3,5(6)-dien-17-one in 20 ml. of anhydrous ether is added in a dropwise fashion with stirring over a 15-minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane: ether to yield 3-ethoxy-7α-difluoromethyl-17α-chloroethynylestra-3,5(6)-dien-17β-ol which is further purified through recrystallization from acetone:hexane.

Hydrolysis with acid by the method recited in Example 3 affords 7α-difluoromethyl-17α-chloroethynylestr-4-en-17β-ol-3-one.

By this procedure, 7α - difluoromethyl-17α-chloroethynylandrost-4-en-17β-ol-3-one is prepared.

EXAMPLE 6

A solution of 1 g. of 3-ethoxy-7α-difluoromethylestra-3,5(6)-dien-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3-ethoxy-7α-difluoromethyl-17α-ethynylestra-3,5(6)-dien-17β-ol which is recrystallized from acetone:hexane.

Hydrolysis with acid by the procedure of Example 3 yields 7α - difluoromethyl-17α-ethynylestr-4-en-17β-ol-3-one.

Similarly, 7α - difluoromethyl - 17α - ethynylandrost-4-en-17β-ol is prepared.

EXAMPLE 7

A mixture of 1 g. of 7α-difluoromethyl-17α-ethynylestr-4-en-17β-ol-3-one, 1 g. of p-toluenesulfonic acid monohydrate, 50 ml. of acetic acid, and 25 ml. of acetic anhydride is allowed to stand at room temperature for 24 hours, and then poured into water and stirred. This mixture is then extracted with methylene chloride and these extracts are dried and evaporated to yield 7α-difluoromethyl - 17α - ethynyl - 17β - acetoxyestr-4-en-3-one which is recrystallized from acetone:ether.

Likewise, the other 17α-aliphatic-17β-ols of this invention are converted to the corresponding 17β-acetates.

EXAMPLE 8

A solution of 1 g. of 3-ethoxy-7α-difluoromethyl-17α-ethynylestra-3,5(6)-dien-17β-ol in 40 ml. of pyridine is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 3-ethoxy-7α-difluoromethyl-17α-vinylestra-3,5(6)-dien-17β-ol which is further purified through recrystallization from acetone.

Hydrolysis with acid according to the procedure of Example 3 gives 7α-difluoromethyl-17α-vinylestr-4-en-17β-ol-3-one.

Similarly, 7α - difluoromethyl - 17α - vinylandrost-4-en 17β-ol-3-one is prepared.

EXAMPLE 9

A solution of 3 g. of 3-ethoxy-7α-difluoromethyl-17α-ethynylestra-3,5(6)-dien-17β-ol in 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure to yield 3-ethoxy-7α-difluoromethyl-17α-ethylestra-3,5(6)-dien-17β-ol which is recrystallized from acetone.

Hydrolysis with acid according to the procedure of Example 3 gives 7α-difluoromethyl-17α-ethylestr-4-en-17β-ol-3-one.

Similarly, 7α - difluoromethyl - 17α - ethylandrost-4-en-17β-ol-3-one is prepared.

The 17β-hydroxy compounds conventionally obtained via the above procedures are esterified according to the procedure set forth in the third, sixth, seventh, and eight paragraphs of Example 3 to give the corresponding 17β-acylates.

EXAMPLE 10

3 - ethoxy - 7α - difluoromethylestra-3,5(6)-dien-17β-ol is hydrolyzed with acid as set forth in Example 3 giving 7α-difluoromethylestr-4-en-17β-ol-3-one.

In like manner, 7α-difluoromethylandrost-4-en-17β-ol-3-one is prepared from 3-ethoxy-7α-difluoromethylandrosta-3,5(6)-dien-17β-ol.

To a solution of 1 g. of 7α-difluoromethylestr-4-en-17β-ol-3-one in 20 ml. of benzene, 20 ml. of dihydrofuran is added. Five milliliters is distilled off to remove moisture and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield the 7α-difluoromethyl-17β-tetrahydrofuran-2'-yloxyestr-4-en-3-one.

In like manner, 7α-difluoromethyl-17β-tetrahydrofuran-2'-yloxyandrost-4-en - 3 - one, 7α - difluoromethyl - 17α-ethynyl - 17β - tetrahydrofuran-2'-yloxyestr-4-en-3-one, and 7α-difluoromethyl - 17α - ethynyl - 17β - tetrahydrofuran - 2' - yloxyandrost - 4 - en-3-one are prepared from the requisite 17β-ol starting compounds. The other 17α-substituted-17β-ols are similarly treated as described herein to give the corresponding 17β-tetrahydrofuran-2'-yloxy ethers.

EXAMPLE 11

Two milliliters of dihydropyran are added to a solution of 1 g. of 7α-difluoromethylestr-4-en-17β-ol-3-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 7α - difluoromethyl - 17β - tetrahydropyran-2'-yloxyandrost-4-en-3-one, which is recrystallized from pentane.

In like manner, 7α - difluoromethyl - 17β-tetrahydropyran - 2' - yloxyandrost - 4 - en - 3 - one, 7α-difluoromethyl - 17α - ethynyl - 17β - tetrahydropyran-2'-yloxyestr - 4 - en - 3 - one, and 7α-difluoromethyl-17α-ethynyl-17β - tetrahydropyran - 2' - yloxyandrost - 4 - en - 3-one are prepared from the requisite 17β-ol starting compounds. The other 17α-substituted-17β-ols are similarly treated as described herein to give the corresponding 17β-tetrahydropyran-2'-yloxy ethers.

EXAMPLE 12

A solution of 10 g. of 7α-difluoromethylstr-4-en-17β-ol-3-one in 300 ml. of methanol is cooled to 0° C. and treated successively with 60 ml. of a cold 30% hydrogen peroxide aqueous solution and 20 ml. of a cold 10% sodium hydroxide aqueous solution. The mixture is allowed to stand for 48 hours at 0° C. after which time it is diluted with water. The resultant oil is extracted with methylene chloride and the methylene chloride extracts washed, dried, and evaporated to give a 4,5-oxido-7α-difluoromethylestr-4-en-17β-ol-3-one mixture, which may be further purified by recrystallization from acetone:hexane. A sample of the 4,5-oxido product mixture thus obtained is fractionally crystallized from ether to a constant melting point to separate the alpha and beta isomers.

EXAMPLE 13

A solution of 2 g. of 4,5-oxido-7α-difluoromethylestr-4-en-17β-ol-3-one in 200 ml. of dioxane is irradiated with a low pressure quartz lamp at about 254 mμ for 54 hours. Thereafter, the solution is dried and concentrated by partial distillation and chromatographed on silica gel to yield 7α - difluoromethyl - A - nor - B-homoestrane-17β-ol-3,5-dione.

Similarly, each of the alpha and beta isomers provided according to the procedure of Example 12 are treated as herein provided to give an identical product in each instance.

In like manner, each of the product compounds prepared according to the procedures set forth in Examples 2, 3, 4, 5, 6, 7, 8, 9, 10, and 11 are used as starting compounds for the procedure set forth in Examples 12 and 13 above to give the corresponding final products therefrom. In this manner, the following representative compounds are prepared:

7α-difluoromethyl-A-nor-B-homoestrane-3,5,17-trione,

7α-difluoromethyl-A-nor-B-homoandrostane-3,5,17-trione,

7α-difluoromethyl-A-nor-B-homoandrostan-17β-ol-3,5-dione,

7α-difluoromethyl-17β-acetoxy-A-nor-B-homoestrane-3,5-dione,

7α-difluoromethyl-17β-adamantoyloxy-A-nor-B-homoestrane-3,5-dione,

7α-difluoromethyl-17β-dichloroacetoxy-A-nor-B-homoestrane-3,5-dione,

7α-difluoromethyl-17β-propionyloxy-A-nor-B-homoestrane-3,5-dione,

7α-difluoromethyl-17β-(3-phenylpropionyloxy-A-nor-B-homoestrane-3,5-dione,

7α-difluoromethyl-17β-decanoyloxy-A-nor-B-homoestrane-3,5-dione,

7α-difluoromethyl-17β-acetoxy-A-nor-B-hohoandrostane-3,5-dione,

7α-difluoromethyl-17α-methyl-A-nor-B-homoestran-17β-ol-3,5-dione,

7α-difluoromethyl-17α-methyl-A-nor-B-homoandrostan-17β-ol-3,5-dione,

7α-difluoromethyl-17α-chloroethynyl-A-nor-B-homoestrane-17β-ol-3,5-dione,

7α-difluoromethyl-17α-chloroethynyl-A-nor-B-homoandrostan-17β-ol-3,5-dione,

7α-difluoromethyl-17α-ethynyl-A-nor-B-homoestran-17β-ol-3,5-dione,

7α-difluoromethyl-17α-ethynyl-A-nor-B-homoandrostan-17β-ol-3,5-dione,

7α-difluoromethyl-17α-ethynyl-17β-acetoxy-A-nor-B-homoestrane-3,5-dione,

7α-difluoromethyl-17α-ethynyl-17β-acetoxy-A-nor-B-homoandrostane-3,5-dione,

7α-difluoromethyl-17α-vinyl-A-nor-B-homoestran-17β-ol-3,5-dione,
7α-difluoromethyl-17α-vinyl-A-nor-B-homoandrostan-17β-ol-3,5-dione,
7α-difluoromethyl-17α-ethyl-A-nor-B-homoestran-17β-ol-3,5-dione,
7α-difluoromethyl-17α-ethyl-A-nor-B-homoandrostan-17β-ol-3,5-dione,
7α-difluoromethyl-17β-tetrahydrofuran-2'-yloxy-A-nor-B-homoestrane-3,5-dione,
7α-difluoromethyl-17β-tetrahydrofuran-2'-yloxy-A-nor-B-homoandrostane-3,5-dione,
7α-difluoromethyl-17α-ethynyl-17β-tetrahydrofuran-2'-yloxy-A-nor-B-homoestrane-3,5-dione,
7α-difluoromethyl-17α-ethynyl-17β-tetrahydrofuran-2'-yloxy-A-nor-B-homoandrostane-3,5-dione,
7α-difluoromethyl-17β-tetrahydropyran-2'-yloxy-A-nor-B-homoestrane-3,5-dione,
7α-difluoromethyl-17β-tetrahydropyran-2'-yloxy-A-nor-B-homoandrostane-3,5-dione,
7α-difluoromethyl-17α-ethynyl-17β-tetrahydropyran-2'-yloxy-A-nor-B-homoestrane-3,5-dione,
7α-difluoromethyl - 17α - ethynyl - 17β-tetrahydropyran-2'-yloxy-A-nor-B-homoandrostane-3,5-dione, as well as the other 17α-aliphatic, 17β-acyloxy, 17β-oxocycloalkyloxy, 17α-aliphatic-17β-acyloxy, and 17α-aliphatic-17β-oxocycloalkyloxy derivatives outlined in Examples 2 through 11 hereof.

What is claimed is:
1. A compound of the formula:

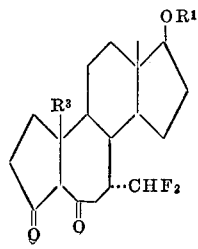

wherein $R^1$ is tetrahydrofuran-2-yl, tetrahydropyan-2-yl, or a hydrocarbon carboxylic acyl group of less than 12 carbon atoms; and $R^3$ is hydrogen or methyl.

2. A compound as recited in claim 1 wherein $R^1$ is tetrahydrofuran-2-yl.
3. A compound as recited in claim 1 wherein $R^1$ is tetrahydropyran-2-yl.
4. A compound as recited in claim 1 wherein $R^1$ is acetyl.
5. A compound as recited in claim 1 wherein $R^1$ is adamantoyl.
6. A compound as recited in claim 1 wherein $R^1$ is dichloroacetyl.
7. A compound as recited in claim 1 wherein $R^1$ is propionyl.
8. A compound as recited in claim 1 wherein $R^1$ is 3-phenylpropionyl.
9. A compound as recited in claim 1 wherein $R^1$ is decanoyl.

References Cited

UNITED STATES PATENTS

| 3,336,336 | 8/1967 | Jeger et al. | 260—586X |
| 3,357,973 | 12/1967 | Beard et al. | 260—239.55 |
| 3,357,975 | 12/1967 | Beard et al. | 260—239.55 |

FOREIGN PATENTS

| 1,353,239 | 1/1964 | France | 260—586 |
| 87,457 | 7/1966 | France | 260—586 |
| 1,369,320 | 7/1964 | France | 260—586 |
| 1,370,565 | 7/1964 | France | 260—488 |
| 6408226 | 1/1965 | Netherlands | 260—586 |

OTHER REFERENCES

Chem. Abstracts, 61 (1964), 1920–1.
Chem. Abstracts, 64 (April 1966), 11286.

NORMA S. MILESTONE, Primary Examiner

U.S. Cl. X.R.

260—347.8, 468, 488, 487, 476, 586, 999